US010162385B2

(12) United States Patent
Park et al.

(10) Patent No.: US 10,162,385 B2
(45) Date of Patent: Dec. 25, 2018

(54) CONDUCTIVE MATERIAL, METHOD OF FABRICATING ELECTRODE, AND DISPLAY DEVICE HAVING THE SAME (71) Applicant: LG DISPLAY CO., LTD., Seoul (KR)

(72) Inventors: JongHyun Park, Paju-si (KR); BoAe Nam, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 86 days.

(21) Appl. No.: 14/136,512

(22) Filed: Dec. 20, 2013

(65) Prior Publication Data

US 2014/0184948 A1 Jul. 3, 2014

(30) Foreign Application Priority Data

Dec. 31, 2012 (KR) .................... 10-2012-0157813

(51) Int. Cl.
*H01B 1/24* (2006.01)
*G06F 1/16* (2006.01)

(52) U.S. Cl.
CPC .......... *G06F 1/1643* (2013.01); *G06F 1/1652* (2013.01); *H01B 1/24* (2013.01)

(58) Field of Classification Search
CPC ...... G06F 1/1643; G06F 1/1652; G06F 1/133; H01B 1/24
USPC .................................................. 345/173–174
See application file for complete search history.

(56) References Cited

U.S. PATENT DOCUMENTS

| 2005/0118922 | A1* | 6/2005 | Endo ....................... G06F 3/045 445/24 |
| 2007/0157873 | A1* | 7/2007 | Hauptmann ........... B82Y 20/00 117/87 |
| 2008/0279756 | A1* | 11/2008 | Zhamu ................ C01B 31/0423 423/448 |
| 2011/0189452 | A1* | 8/2011 | Lettow ..................... B05D 3/10 428/220 |
| 2012/0164539 | A1* | 6/2012 | Zhamu ................ H01M 4/0445 429/300 |

FOREIGN PATENT DOCUMENTS

| CN | 101783275 A | 7/2010 |
| CN | 102650917 A | 8/2012 |
| CN | 103081027 A | 5/2013 |
| TW | 200518000 A | 6/2005 |

OTHER PUBLICATIONS

Wang et al.J. Am. Chem. Soc. vol. 130, No. 26, pp. 8152-8153, 2008.*
Ostrick et al., J.Appl.Phys.vol. 81, No. 10, pp. 6804-6808, May 15, 1997.*

(Continued)

*Primary Examiner* — Sophie Hon
*Assistant Examiner* — Sow Fun Hon
(74) *Attorney, Agent, or Firm* — Seed IP Law Group LLP (57) ABSTRACT

Disclosed is a conductive material fabricated with a reduced fabrication cost and through simplified processes. The conductive material comprises: liquid graphene including flakes; and a conductive monomer including an aromatic benzene ring, the conductive monomer being mixed with the liquid grapheme to form cross-linkages among the flakes.

8 Claims, 5 Drawing Sheets

(56) References Cited

OTHER PUBLICATIONS

'Graphene-promoted 3,4,9,10-perylenetetracarboxylic acid nanocomposite as redox probe in label-free electrochemical aptasensor', Yali Yuan, Sep. 6, 2011, Biosensors and Bioelectronics 30, (2011), pp. 123-127 [retrieved online on May 12, 2017]. <URL:http://www.sciencedirect.com/science/article/pii/S0956566311005987>.*
Office Action dated Sep. 29, 2015 for corresponding Chinese Patent Application No. 201310704069.8, 15 pages.

* cited by examiner

CONDUCTIVE MATERIAL, METHOD OF FABRICATING ELECTRODE, AND DISPLAY DEVICE HAVING THE SAME

CROSS-REFERENCE TO RELATED APPLICATION

Pursuant to 35 U.S.C. § 119(a), this application claims the benefit of earlier filing date and right of priority to Korean Application No. 10-2012-0157813, filed on Dec. 31, 2012, the contents of which is incorporated by reference herein in its entirety.

BACKGROUND OF THE DISCLOSURE

1. Field of the Disclosure

The present disclosure relates to a conductive material for a display device and a method for fabricating an electrode, and particularly, to a conductive material having excellent electrical conductivity by using graphene applied to a flexible display device, a method for fabricating an electrode, and a display device having the same.

2. Background of the Disclosure

Recently, various types of flat display devices, capable of overcoming disadvantages of a cathode ray tube, e.g., a large weight and a massive volume, are being developed. Such flat display devices may include liquid crystal display (LCD) devices, field emission display devices, plasma display devices, organic electroluminescent display devices, etc.

Among such flat display devices, the plasma display device is being spotlighted as a display device the most suitable to a large screen, due to its simplified structure (i.e., light, thin, short and small structure) and fabrication processes. However, such plasma display device is disadvantageous in that light-emitting efficiency and brightness are low, and power consumption is large. On the other hand, the LCD device has disadvantages that a large screen is not easily implemented due to semiconductor processes, and power consumption is large due to a backlight unit. Further, the LCD device has disadvantages that an optical loss is great and a viewing angle is narrow due to optical devices such as a polarizing filter, a prism sheet and a diffusion plate.

The electroluminescent display device is distinguished from an inorganic electroluminescent display device according to a material of a light-emitting layer. The organic electroluminescent display device, a spontaneous light-emitting device which emits light spontaneously has advantages that a response speed is rapid, light-emitting efficiency is high, and brightness and a viewing angle are large. The inorganic electroluminescent display device has larger power consumption than the organic electroluminescent display device, cannot have high brightness, and cannot emit various colors of red, green and blue (RGB). On the other hand, the organic electroluminescent display device is driven at a low direct current voltage of several tens of voltages, has a rapid response speed and high brightness, and emits various colors of RGB. Accordingly, the organic electroluminescent display device is being actively researched.

The organic electroluminescent display device has a structure that an organic light-emitting layer is disposed between a cathode and an anode. Electrons from the anode are injected to the organic light-emitting layer, and holes from the cathode are injected to the organic light-emitting layer. As a result, excitons are generated in the organic light-emitting layer. As the excitons decay, light corresponding to an energy difference between a lowest unoccupied molecular orbital (LUMO) and a highest occupied molecular orbital (HOMO) of the organic light-emitting layer is generated. Then, the generated light is emitted to outside. The cathode is formed of a metallic material having a low work function, and the anode is formed of a transparent conductive material such as an Indium Tin Oxide (ITO) having a high work function.

However, the organic electroluminescent display device may have the following problems.

Firstly, the ITO used as an anode is a metallic oxide, which causes signal delay due to its large resistance. Further, such ITO is not suitable for an electrode of a flexible display device in recent years when the demand for a flexible organic electroluminescent display device increases drastically.

SUMMARY OF THE DISCLOSURE

A method comprising: forming liquid graphene oxide by oxidizing a graphite; reducing the graphene oxide; and forming cross-linkages among graphene flakes by mixing a conductive monomer including an aromatic benzene ring with the reduced graphene.

The conductive material may be used as a transparent electrode of various types of display devices including a liquid crystal display panel, an organic electroluminescent display panel and an electrophoresis display panel, or may be used as an electrode of a touch panel.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, the present invention will be explained in more detail.

In the present invention, an electrode is formed using grahene rather than the conventional metallic oxide such as indium tin oxide (ITO). Such graphene is a two-dimensional material implemented as carbon atoms are arranged in a single-layered honeycomb lattice. Since 2004 when the graphene was firstly discovered, it has been much researched due to a small thickness, high electrical conductivity, high thermal conductivity and flexibility.

Such graphene may be fabricated in various manners. Well-known fabrication methods include a mechanical method such as a scotch tape technique, and a chemical method such as a Chemical Vapor Deposition (CVD) grown method.

According to the scotch tape technique (the first graphene forming method), graphite flakes, a general scotch tape and a $SiO_2$ wafer are prepared. The graphite flakes are put on the scotch tape, and then the scotch tape is folded and unfolded repeatedly. Then, the tape is put on the $SiO_2$ wafer, and the graphite flakes are scrubbed, thereby forming multi-layered graphene from single-layered graphene. However, the graphene fabricated by the scotch tape technique is not easily applied to devices, because its size and shape cannot be controlled.

According to the CVD grown method, a transition metal which absorbs carbon well, such as Ni, Cu and Pt is prepared as a catalyst layer. Then, a mixed gas such as $CH_4$, $H_2$ and Ar is injected to the catalyst layer at a high temperature of 1,000☐ or more than. Under an atmosphere of the the mixed gas, carbon reacts with the catalyst layer. If the resulting material is drastically cooled, the carbon is exfoliated from the catalyst layer to grow graphene on the surface of the catalyst layer. Then, if the catalyst layer or a supporting layer is removed using an etching solution, the graphene can be exfoliated from the surface of the catalyst to thus be transferred onto a desired substrate.

However, such CVD grown method has the following disadvantages.

Firstly, expensive vacuum equipment is required as the CVD grown method is performed in a vacuum state, and a fabrication cost increases as processes are performed at a high temperature. Further, in order to form graphene on a substrate of a large area, a vacuum chamber should have a large size because processes are performed in the vacuum chamber. Accordingly, it was not suitable to substantially form graphene on a large substrate.

In the present invention, graphene is formed in a novel manner rather than the CVD grown method, a mechanical method. Especially, in the present invention, graphene can be fabricated with a low fabrication cost due to simplified processes, and graphene can be fabricated on a large substrate.

Graphene can be used for various purposes. For instance, graphene can be used in a high-speed transistor, an optical detector, etc. In the present invention, graphene is configured as a transparent electrode of a liquid crystal display device, an organic electroluminescent display device, a touch panel, etc. Especially, graphene can be effectively used as an electrode of a flexible display device due to its flexible characteristic.

In the present invention, an electrode can be formed on a large substrate by applying liquid graphene onto the substrate. To this end, liquid graphene flakes are formed, and then the liquid graphene flakes are electrically connected to each other. As a result, conductive graphene layers are formed to thus implement an electrode.

Figure 1:
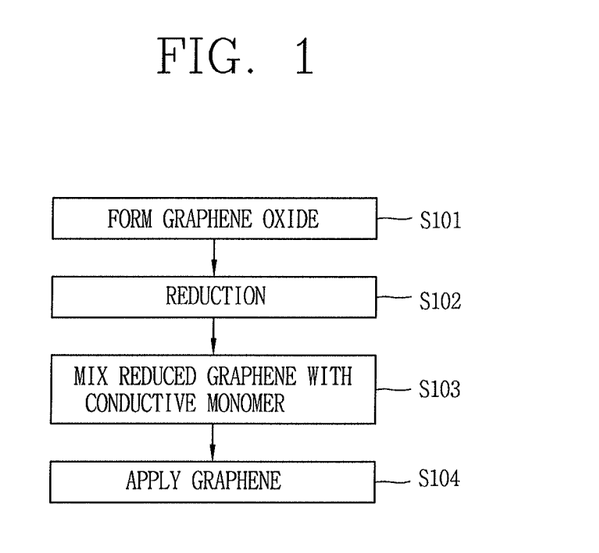
FIG. 1 is a flowchart illustrating a method for fabricating a conductive material according to and embodiment of the present invention.

FIG. 1 is a flowchart illustrating a method for fabricating graphene according to the present invention.

As shown in FIG. 1, graphite is oxidized by strong acid, an oxidizing agent, etc., thereby forming a graphite oxide aqueous solution containing an oxygen functional group in carbon such as a hydroxyl group, an epoxide group, a carboxyl group and a lactone group (S101). As oxidized graphite has a high hydrophilic property, water molecules easily penetrate to a gap between layers of the oxidized graphite. As the gap between the layers increases due to the penetration of the water molecules, a single layer can be easily exfoliated by a stirring process for a long time, or by using an ultrasonicator.

Then, the graphite oxide aqueous solution is reduced using a reducing agent such as hydrogen sulfide, hydrazine, hydroquinone, sodium hydroxide, potassium hydroxide and aluminum powder, thereby forming a graphene aqueous solution (S102). Generally, oxidized graphite loses its own property, because it exists in a bonded state with a hydroxyl group, an epoxide group, a carboxyl group, etc. Accordingly, if the oxidized graphite is reduced again to remove a functional group containing oxygen, characteristics of graphene can be obtained.

Then, the reduced graphene is mixed with a conductive monomer (S103).

Figure 2A:
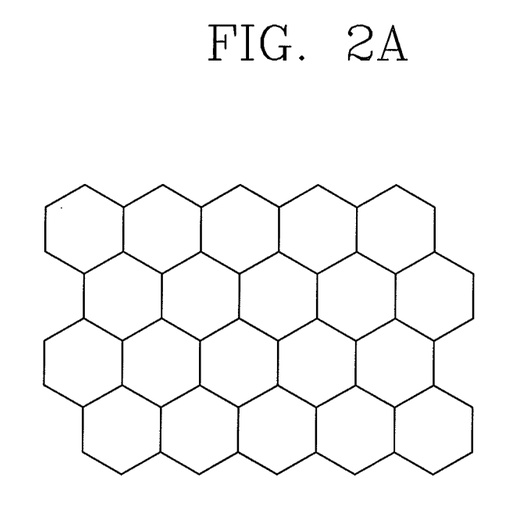
FIG. 2A is a view illustrating an ideal structure of graphene.
Figure 2B:
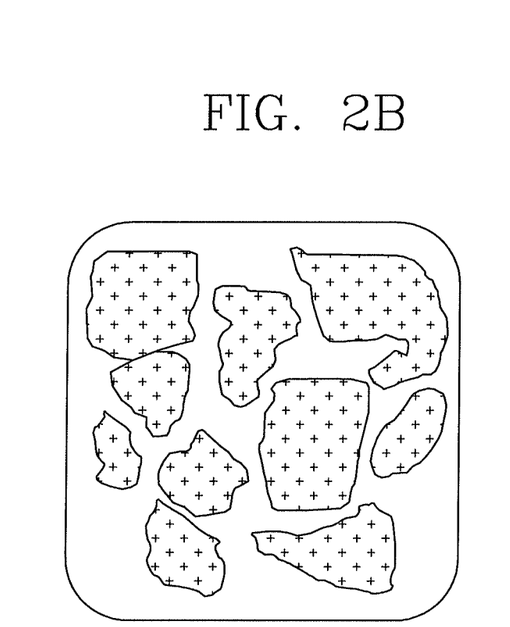
FIG. 2B is a view illustrating a structure of graphene having undergone oxidation and reduction.

As shown in FIG. 2A, an ideal structure of graphene is a two-dimensional structure where graphene is arranged in a hexagonal honeycombed form. However, as shown in FIG. 2B, graphene is arranged in the form of flakes when it has undergone oxidation and reduction. There occurs a space among flakes as graphene is partially formed. In a case where an electrode is formed of graphene, such space may cause the electrode to have lowered conductivity due to an increased resistance of the graphene.

Figure 3:
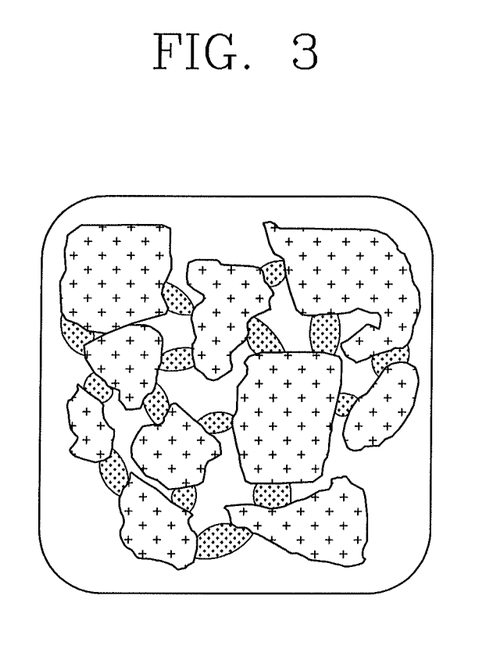
FIG. 3 is a view illustrating a structure of graphene mixed with a conductive monomer.

If a conductive monomer is mixed liquid graphene, cross-linkages are formed among flakes of the liquid graphene as shown in FIG. 3. As the conductive monomer, may be used a conductive monomer having an aromatic benzene ring, such as PTCDA (Perylene-2,3,4,10-tetracarboxylic dianhydride), NTCDA (1,4,5,8-Naphthalene tetracarboxylic dianhydride) and PTCA (3,4,9,10-Perylene Tatracarboxylic acid).

The following chemical formulas 1,2 and 3 represent a chemical structural formulas on PTCDA, NTCDA and PTCA, respectively.

[Chemical Formula 1]

-continued

[Chemical Formula 2]

[Chemical Formula 3]

Once the conductive monomer is mixed with liquid graphene having flakes, three electrons among four outer electrons which constitute graphene form sp2 hybrid orbital to thus form 'σ' bond, a strong covalent bond. The rest one electron forms p-orbital, and the p-orbital has 'π-π' bond with p-orbital of the conductive monomer. As a result, cross-linkages are formed among the flakes of the graphene, and thus the entire resistance of the graphene is reduced.

The liquid graphene is applied onto a substrate and then is etched, thereby forming a desired type of electrode (S104).

Such application may be performed in various manners, e.g., using a spin coating, a roll coating, a dip coating and a screen coating. According to the spin coating, a substrate is arranged onto a rotation plate which rotates at a constant speed, and then liquid graphene is dropped onto the rotating substrate so as to be applied onto the entire surface of the substrate. According to the roll coating, liquid graphene is applied onto the surface of a roller, and the roller which is in a contact state with a substrate is moved. As a result, the graphene applied onto the surface of the roller is transferred onto the substrate.

According to the dip coating, liquid graphene is put into a vessel, and a substrate is immersed into the vessel so that the graphene can be applied onto the substrate. According to the screen coating, a screen having an opening is arranged on a substrate, and graphene is arranged on the screen. Then, the graphene is pressed by a squeeze operation, etc., so that the graphene can be discharged to the opening to thus be applied onto the substrate.

An application method of graphene is not limited to the above specific methods, but may include various methods.

After the graphene layer applied onto the substrate is cured, the graphene layer is patterned into a desired shape by a patterning method such as a photolithography process. As a result, an electrode is formed.

As aforementioned, in the present invention, liquid graphene flakes are formed by oxidation and reduction. Then, a conductive monomer containing an aromatic benzene ring is mixed with the liquid graphene flakes. As a result, obtained is liquid graphene having cross-linkages among the flakes.

Such liquid graphene can be applied onto the substrate to form a graphene layer. Accordingly, no expensive vacuum equipment or high-temperature processes used in the conventional CVD grown method are not required in the present invention. As a result, fabrication costs can be reduced, and production efficiency can be enhanced.

Graphene can be used for various purposes. However, in the present invention, graphene is mainly used as an electrode of a display device or a touch panel. As aforementioned, the graphene of the present invention is mixed with a conductive monomer so that cross-linkages can be formed among flakes. Due to the cross-linkages, the graphene is electrically conducted to have a very low resistance. Accordingly, the graphene of the present invention can be effectively used as an electrode of a display device. Especially, graphene can be effectively used as an electrode of a flexible display device, due to its flexible characteristic.

Hereinafter, a display device to which such graphene has been applied will be explained. The graphene of the present invention can be used as an electrode of all types of display devices. However, a specific display device to which the graphene of the present invention has been applied will be explained hereinafter.

Figure 4:
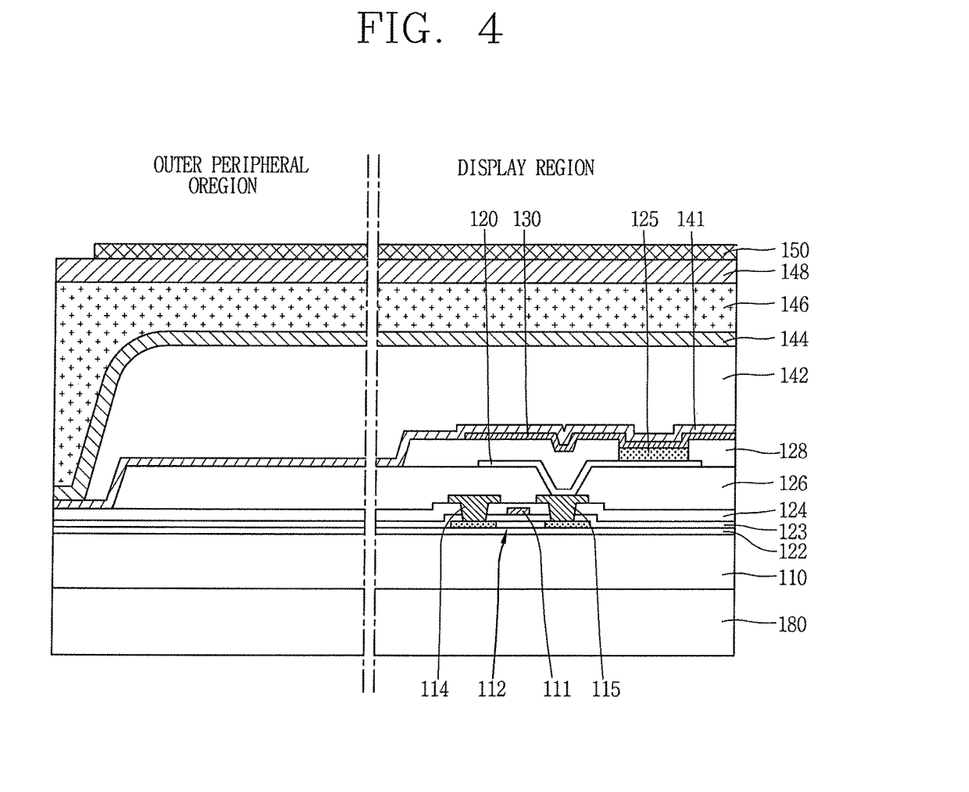
FIG. 4 is a view illustrating a structure of an embodiment of organic electroluminescent display device to which a conductive material of the present invention has been applied.

FIG. 4 is a view illustrating a structure of an organic electroluminescent display device to which graphene of the present invention has been applied. Generally, an organic electroluminescent display device includes R, G and B pixels which emit red light, green light and blue light, respectively. However, in the present invention, two adjacent pixel regions, i.e., an outermost pixel region in a display region and a neighboring pixel region in an outer peripheral region were displayed for convenience.

As shown in FIG. 4, the organic electroluminescent display device 101 of the present invention includes a display region for displaying images as a plurality of pixel regions are formed; and an outer peripheral region formed at an outer periphery of the display region, and having lines and pads for transmitting signals applied from outside into the display region.

A buffer layer 122 is formed on a substrate 110 formed of a flexible material such as plastic, and a thin film transistor (TFT) is formed on the buffer layer 122 in the display region. Although not shown, the TFT includes a semiconductor layer 112 formed on the buffer layer 122 at R, G and B pixel regions, a first insulating layer 123 formed on the substrate 110 where the semiconductor layer 112 has been formed, a gate electrode 111 formed on the first insulating layer 123, a second insulating layer 124 formed over the substrate 110 so as to cover the gate electrode 111, and a source electrode 114 and a drain electrode 115 which contact the semiconductor layer 112 through a contact hole of the first insulating layer 123 and a contact hole of the second insulating layer 124, respectively.

The buffer layer 122 may be formed as a single layer or multi layers. The semiconductor layer 112 maybe formed of a transparent oxide semiconductor such as a crystalline silicone or IGZO (Indium Gallium Zinc Oxide). The semiconductor layer 112 is composed of a channel layer formed at a central region thereof, and a doping layer formed at two sides thereof. The doping layer contacts the source electrode 114 and the drain electrode 115.

The gate electrode 111 may be formed of a metallic material such as Cr, Mo, Ta, Cu, Ti, Al or Al alloy. The first insulating layer 123 and the second insulating layer 124 may be configured as a single layer formed of an inorganic insulating material such as $SiO_2$ or $SiNx$, or may be configured as a double layer formed of $SiO_2$ and $SiNx$. The source electrode 114 and the drain electrode 115 may be formed of Cr, Mo, Ta, Cu, Ti, Al or Al alloy.

A third insulating layer 126 is formed on the substrate 110 where the thin film transistor has been formed. The third insulating layer 126 may be formed of an inorganic insulating material such as $SiO_2$.

Although not shown, an overcoat layer for planarizing the substrate 110 may be formed on the third insulating layer 126.

Although not shown, a gate pad for applying a scan signal to the gate electrode 111 of the thin film transistor, and a data pad for applying a signal to a pixel electrode are formed at the outer region.

A contact hole 129 is formed at the third insulating layer 126 formed on the drain electrode 115 of the driving thin film transistor, at each pixel region in the display region. A pixel electrode 120 formed on the third insulating layer 126 is electrically-connected to the drain electrode 115 of the thin film transistor, through the contact hole 129.

A bank layer 128 is formed at an interface between the pixel regions, on the third insulating layer 126 in the display region. The bank layer 128, serving as a barrier, prevents light of a specific color from being output from a neighboring pixel region in a mixed manner. The bank layer 128 reduces the size of a stepped portion, because it fills part of the contact hole 129. This can prevent occurrence of inferiority of an organic light-emitting portion 125 due to a large stepped portion.

The pixel electrode 120 is formed in the display region. The pixel electrode 120 is formed of a metallic material such as Ca, Ba, Mg, Al and Ag. As the pixel electrode 120 is connected to the drain electrode 115 of the thin film transistor, an image signal is applied to the pixel electrode 120 from outside.

The organic light-emitting portion 125 is formed on the pixel electrode 120 between the bank layers 128. The organic light-emitting portion 125 includes an R organic light-emitting layer which emits red light, a G organic light-emitting layer which emits green light, and a B organic light-emitting layer which emits blue light. Although not shown, the organic light-emitting portion 125 may further include an electron injection layer for injecting electrons to the organic light-emitting layer, a hole injecting layer for injecting holes to the organic light-emitting layer, an electron transport layer for transporting injected electrons to the organic light-emitting layer, and a hole transport layer for transporting injected holes to the organic light-emitting layer.

Alternatively, the organic light-emitting layer may be configured as a white organic light-emitting layer which emits white light. In this case, RGB color filter layers are formed below the white organic light-emitting layer, e.g., at RGB sub pixel regions on the insulating layer 124. The RGB color filter layers convert white light emitted from the white organic light-emitting layer, into red light, green light and blue light. The white organic light-emitting layer may be formed as a plurality of organic materials which emit lights of R, G and B individually are mixed with each other. Alternatively, the white organic light-emitting layer may be formed as a plurality of light-emitting layers which emit lights of R, G and B individually are laminated with each other.

A common electrode 130 is formed on the organic light-emitting portion 125 in the display region. The common electrode 130 is formed of graphene mixed with a conductive monomer. The common electrode 130 is formed by applying liquid graphene onto the substrate 110, curing the liquid graphene, and then patterning the liquid graphene. The graphene has more excellent conductivity than the conventional transparent metal oxide material such as ITO (Indium Tin Oxide) or IZO (Indium Zinc Oxide), thereby preventing signal delay due to its resistance in a large organic electroluminescent display device. Further, the common electrode 130 formed of graphene has higher flexibility than ITO or IZO. Accordingly, when a user applies an impact to an organic electroluminescent display device for bending, the common electrode 130 of the organic electroluminescent display device is not damaged by the impact.

The common electrode 130 is a cathode of the organic light-emitting portion 125, and the pixel electrode 120 is an anode of the organic light-emitting portion 125. Once a voltage is applied to the common electrode 130 and the pixel electrode 120, electrons from the common electrode 130 are injected to the organic light-emitting portion 125. And holes from the pixel electrode 120 are injected to the organic light-emitting portion 125. As a result, excitons are generated from the organic light-emitting layer. As the excitons decay, light corresponding to an energy difference between a lowest unoccupied molecular orbital (LUMO) and a highest occupied molecular orbital (HOMO) of the organic light-emitting layer is generated. Then, the generated light is emitted to outside (toward an upper side of the common electrode 130).

A first passivation layer 141 is formed over the third insulating layer 126, the bank layer 128 and the common electrode 130 at the outer peripheral region and the display region. The first passivation layer 141 is formed of an inorganic material such as $SiO_2$ or SiNx.

An organic layer 143, formed of an organic material such as polymer, is disposed on the first passivation layer 141. A second passivation layer 144 formed of an inorganic material such as $SiO_2$ or SiNx is formed on the organic layer 143.

An adhesive is applied onto the second passivation layer 144 to thus form an adhesive layer 146. A passivation film 148 is disposed on the adhesive layer 146, to thus be attached to the second passivation layer 144 by the adhesive layer 146.

Any material having excellent adhesion property, heat-proof property and waterproof property may be used as the adhesive. However, in the present invention, a thermal hardening resin such as an epoxy-based compound, an acrylate-based compound or an acryl-based rubber is used as the adhesive. In this case, the adhesive layer 146 is applied in a thickness of about 5-100 μm, and is hardened at a temperature of about 80-170☐. As the adhesive, a photo-polymer resin may be used. In this case, light such as ultraviolet rays is irradiated onto the adhesive layer 146 to thus harden the adhesive layer 146.

The adhesive layer 146 serves to attach the substrate 110 and the passivation film 148 to each other. Further, the adhesive layer 146 serves as an encapsulant for preventing moisture from being introduced into the organic electroluminescent display device. Therefore, in the detailed description of the present invention, reference numeral 146 is referred to as an adhesive for convenience. The adhesive layer may be also referred to as an 'encapsulation material'.

The passivation film 148, an encapsulation cap for encapsulating the adhesive layer 146, may be implemented as a polystyrene (PS) film, a polyethylene (PE) film, a polyethylene naphthalate (PEN) film, or a polyimide (PI) film.

A polarizing plate 150 may be attached onto the passivation film 148. The polarizing plate 150 transmits light emitted from the organic electroluminescent display device, and prevents light incident from outside from being reflected, thereby enhancing a picture quality.

Figure 5:
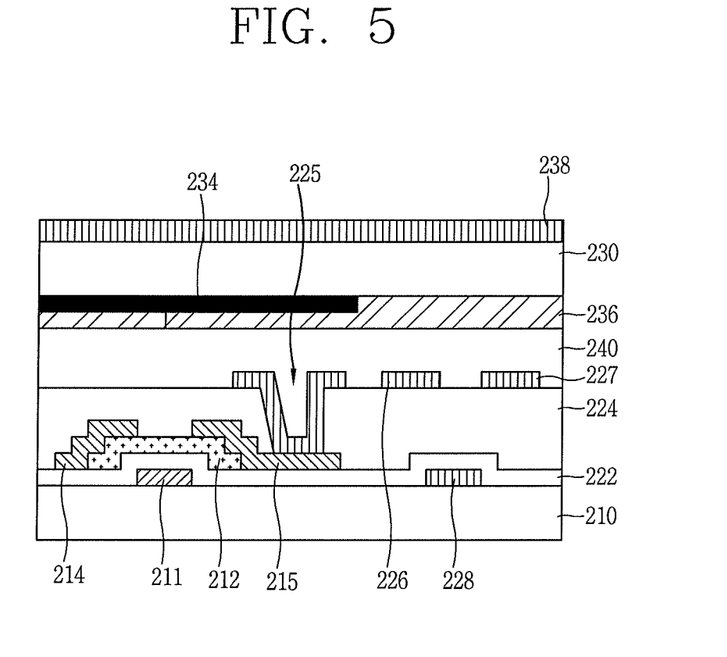
FIG. 5 is a view illustrating a structure of an embodiment of a liquid crystal display (LCD) device to which a conductive material of the present invention has been applied.

FIG. 5 is a view illustrating a structure of a liquid crystal display (LCD) device to which graphene of the present invention has been applied. The LCD device is configured as an LCD device to which a touch panel has been applied. Generally, a touch panel has an 'ON'-cell structure where a driving device and a touch sensor are formed outside a display device, and an 'IN'-cell structure where a driving device and a touch sensor are formed inside a display device. However, the touch panel of FIG. 5 has a hybrid structure where a touch sensor is mounted inside a display device, and a driving electrode is mounted outside the display device.

As shown in FIG. 5, a sensor electrode 228 and a thin film transistor (TFT) are formed on a first substrate 210. The TFT includes a gate electrode 211 formed on the first substrate 210, a gate insulating layer 222 formed over the first substrate 210 where the gate electrode 211 has been formed, a semiconductor layer 212 formed on the gate insulating layer 222, and a source electrode 214 and a drain electrode 215 formed on the semiconductor layer 212.

A passivation layer 224 is formed on the TFT over the first substrate 210. As a common electrode 226 and a pixel electrode 227 each having a belt shape of a prescribed width are disposed in parallel on the passivation layer 224, a horizontal electric field is formed between the common electrode 226 and the pixel electrode 227 in parallel to the surface of the first substrate 210. The pixel electrode 227 is electrically-connected to the drain electrode 215 of the thin film transistor through the contact hole 225 of the passivation layer 224. An image signal from outside is applied to the pixel electrode 227 through the thin film transistor.

The common electrode 226 and the pixel electrode 227 are formed of graphene mixed with a conductive monomer. The common electrode 226 and the pixel electrode 227 are formed by applying liquid graphene onto the first substrate 210, curing the liquid graphene and then patterning the liquid graphene. The graphene has excellent conductivity, thereby preventing signal delay due to its resistance in a large organic electroluminescent display device. Further, the common electrode 226 and the pixel electrode 227 formed of graphene have higher flexibility. Accordingly, when a user applies an impact to an organic electroluminescent display device for bending, the common electrode 226 and the pixel electrode 227 of the organic electroluminescent display device are not damaged by the impact.

A black matrix 234 and a color filter layer 236 are formed in a second substrate 230. The black matrix 234 is formed of Cr or CrOx, and prevents degradation of a picture quality by preventing light from being transmitted to a non-display region such as a gate line forming region, a data line forming region and a TFT forming region. The color filter layer 236 is formed of R, G and B color filter layers, thereby substantially implementing images.

Although not shown, an overcoat layer for protecting the color filter layer 236 and planarizing the second substrate 230 may be formed on the color filter layer 236.

A driving electrode 238 is formed outside the second substrate 230. The driving electrode 238 is formed of graphene mixed with a conductive monomer, and is formed in plurality on outer side surfaces of the second substrate 230 in a band shape of a preset width.

Although not shown, an optical clear adhesive is applied onto outside of the second substrate 230, i.e., onto the driving electrode 238. Then, a protection glass or a protection film is attached onto the optical clear adhesive. An Ag dot is formed between the first substrate 210 and the second substrate 230, so that a constant current can be supplied to the driving electrode 238 through the Ag dot.

As aforementioned, in the present invention, the transparent electrode is formed of graphene mixed with a conductive monomer. The transparent electrode is configured as an electrode of various types of display devices such as a liquid crystal display device and an organic electroluminescent display device. The transparent electrode may be also used as an electrode of a functional panel such as a touch panel.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A method for forming a conductive material, the method comprising:
    forming graphite oxide aqueous solution by oxidizing a graphite;
    reducing the graphite oxide aqueous solution to form graphene flakes; and
    forming cross-linkages among the graphene flakes by mixing a conductive monomer including an aromatic benzene ring with the reduced graphene flakes,
    wherein the cross-linkages are each formed between a p-orbital of the graphene flake and a p-orbital of the aromatic benzene ring of the conductive monomer, and
    wherein the graphene flakes are disposed in a plane, and the graphene flakes are horizontally connected to each other in the plane by the cross-linkages.

2. The method of claim 1, wherein the reducing of the graphite oxide aqueous solution includes reducing graphite oxide aqueous solution using an reducing agent selected from the group consisting of hydrogen sulfide, hydrazine, hydroquinone, sodium hydroxide, potassium hydroxide, and aluminum powder.

3. A method for forming a conductive material, the method comprising:
    providing a graphite oxide aqueous solution wherein water molecules penetrate into a gap between layers of the graphite oxide in the graphite oxide aqueous solution;
    reducing the graphite oxide in the graphite oxide aqueous solution to form graphene flakes; and
    conductively connecting a plurality of the graphene flakes to each other;
    wherein the connecting of the graphene flakes includes forming cross-linkages among the graphene flakes by mixing a conductive monomer having an aromatic benzene ring moiety with the reduced graphene flakes;

wherein the cross-linkages are each formed between a p-orbital of the graphene flake and a p-orbital of the aromatic benzene ring of the conductive monomer, and wherein the graphene flakes are disposed in a plane, and the graphene flakes are horizontally connected to each other in the plane by the cross-linkages.

4. The method of claim 3, wherein the reducing of the graphite oxide aqueous solution includes reducing graphite oxide aqueous solution using an reducing agent selected from the group consisting of hydrogen sulfide, hydrazine, hydroquinone, sodium hydroxide, potassium hydroxide, and aluminum powder.

5. The method of claim 3, wherein the method consists essentially of the following steps:

providing a graphite oxide aqueous solution wherein water molecules penetrate into a gap between layers of the graphite oxide in the graphite oxide aqueous solution;

reducing the graphite oxide in the graphite oxide aqueous solution to form graphene flakes; and conductively connecting a plurality of the graphene flakes to each other;

wherein the connecting of the graphene flakes includes forming cross-linkages among the graphene flakes by mixing PTCA (3,4,9,10-Perylene Tetracarboxylic acid) having an aromatic benzene ring moiety with the reduced graphene flakes, and wherein the cross-linkages are covalent bonds or ionic bonds, and are each formed between a p-orbital of the graphene flake and a p-orbital of the aromatic benzene ring of the PTCA.

6. A method of fabricating a display device or touch panel, comprising:

providing a display panel or touch panel configured to display an image;

forming a graphite oxide aqueous solution by oxidizing a graphite;

reducing the graphite oxide in the graphite oxide aqueous solution to form graphene flakes;

forming cross-linkages among the graphene flakes by mixing a conductive monomer having an aromatic benzene ring moiety with the graphene flakes, wherein the cross-linkages are each formed between a p-orbital of the graphene flake and a p-orbital of the aromatic benzene ring of the conductive monomer;

depositing the cross-linked graphene flakes over at least one inner surface of the display panel or touch panel; and patterning the deposited cross-linked graphene flakes to form at least one electrode, wherein the cross-linked graphene flakes are disposed in a plane, and the graphene flakes are horizontally connected to each other in the plane by the cross-linkages.

7. A method for forming a conductive material, the method consisting essentially of the following steps:

forming graphite oxide aqueous solution by oxidizing a graphite;

reducing the graphite oxide aqueous solution to form graphene flakes; and forming cross-linkages among the graphene flakes by mixing PTCA (3,4,9,10-Perylene Tetracarboxylic acid) including an aromatic benzene ring with the reduced graphene flakes, wherein the cross-linkages are covalent bonds or ionic bonds, and are each formed between a p-orbital of the graphene flake and a p-orbital of the aromatic benzene ring of the PTCA, and wherein the graphene flakes are disposed in a plane, and the graphene flakes are horizontally connected to each other in the plane by the cross-linkages.

8. The method of claim 7, wherein the reducing of the graphite oxide aqueous solution includes reducing graphite oxide aqueous solution using an reducing agent selected from the group consisting of hydrogen sulfide, hydrazine, hydroquinone, sodium hydroxide, potassium hydroxide, and aluminum powder.

* * * * *